US008189096B2

(12) United States Patent
Azar et al.

(10) Patent No.: US 8,189,096 B2
(45) Date of Patent: May 29, 2012

(54) VIDEO LIGHT SYSTEM AND METHOD FOR IMPROVING FACIAL RECOGNITION USING A VIDEO CAMERA

(75) Inventors: Cyrus Azar, Spokane Valley, WA (US); George Brostoff, Covert, MI (US)

(73) Assignee: Sensible Vision, Inc., Covert, MI (US)

( * ) Notice: Subject to any disclaimer, the term of this patent is extended or adjusted under 35 U.S.C. 154(b) by 322 days.

(21) Appl. No.: 12/486,980

(22) Filed: Jun. 18, 2009

(65) Prior Publication Data
US 2009/0251560 A1 Oct. 8, 2009

Related U.S. Application Data

(63) Continuation-in-part of application No. 11/154,879, filed on Jun. 16, 2005.

(51) Int. Cl.
*H04N 5/222* (2006.01)
(52) U.S. Cl. .................. 348/370; 348/207.1; 348/222.1; 348/371

(58) Field of Classification Search ............... 348/207.1, 348/207.11, 370–371, 222.1
See application file for complete search history.

(56) References Cited

U.S. PATENT DOCUMENTS

| | | | |
|---|---|---|---|
| 6,111,517 A * | 8/2000 | Atick et al. ................. 340/5.83 |
| 7,616,882 B2 * | 11/2009 | Guthrie et al. ............... 396/205 |
| 7,631,979 B1 * | 12/2009 | Brown et al. .................... 362/3 |
| 2007/0081094 A1 * | 4/2007 | Ciudad et al. ................ 348/371 |
| 2008/0316325 A1 * | 12/2008 | Nakahara ................... 348/222.1 |
| 2009/0160945 A1 * | 6/2009 | Chung et al. ............... 348/207.1 |
| 2009/0262200 A1 * | 10/2009 | Takabatake et al. ....... 348/207.1 |

* cited by examiner

*Primary Examiner* — Tuan Ho
*Assistant Examiner* — Kent Wang
(74) *Attorney, Agent, or Firm* — Price Heneveld, LLP

(57) ABSTRACT

A video lighting system (100) for use with a personal computer or other electronic device (103) includes a display (105) that is used in connection with a microprocessor running facial recognition software that is used to prevent unauthorized access to the personal computer (103). A camera (107) is used for providing images to the facial recognition software where the display operates in a first mode for displaying images to a user and in a second mode for illuminating the user's face for detection by the camera (107).

25 Claims, 3 Drawing Sheets

VIDEO LIGHT SYSTEM AND METHOD FOR IMPROVING FACIAL RECOGNITION USING A VIDEO CAMERA

CROSS-REFERENCE TO RELATED APPLICATIONS

This application is a continuation-in-part of U.S. patent application Ser. No. 11/154,879 filed on Jun. 16, 2005, entitled "SYSTEM AND METHOD FOR PROVIDING SECURE ACCESS TO AN ELECTRONIC DEVICE USING FACIAL BIOMETRICS" and assigned to Sensible Vision, Inc.

FIELD OF THE INVENTION

The present invention relates generally to ambient lighting used with a video camera and more particularly lighting used with an electronic device for improving facial recognition.

BACKGROUND

Portable cameras used in connection with laptop computers are being more commonly used in connection with these devices. Not only are aftermarket add-on cameras often used with the laptop computer, but many laptop manufacturers now have a camera integrated into the computer's housing for use in streaming video and security applications. In at least one application, the camera can be used in connection with facial recognition software which allows access to the computer and memory devices only to authenticated users.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
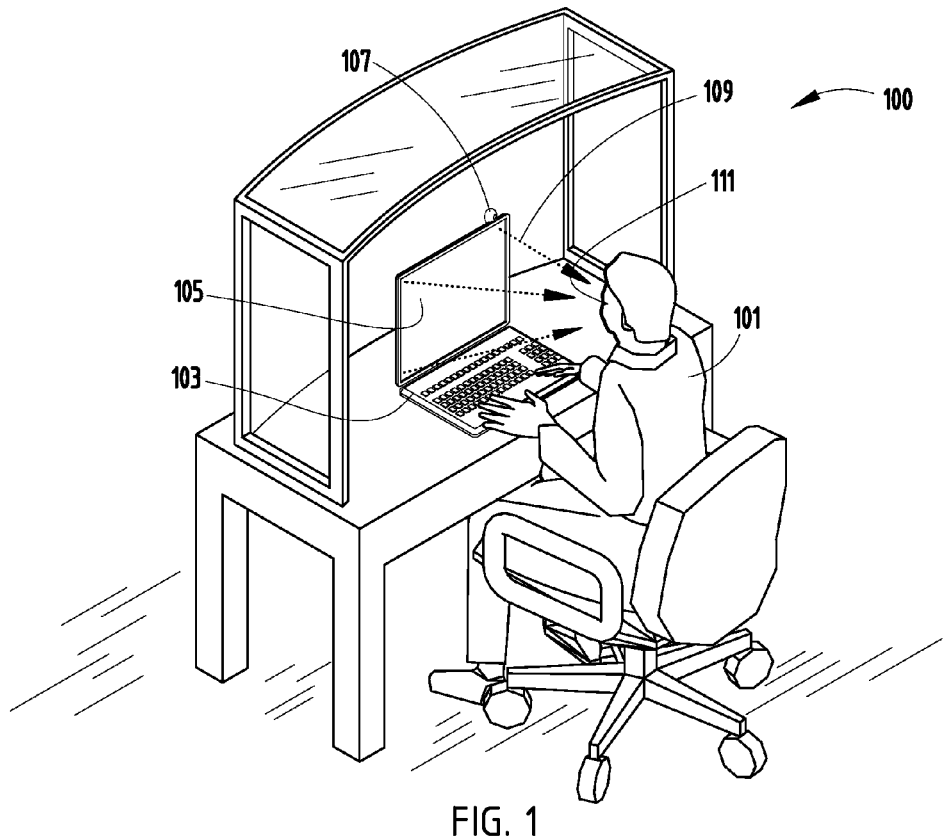
FIGS. 1, 1A, and 1B are illustrations showing the use of the video light system and display in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve under-standing of embodiments of the present invention.

DETAILED DESCRIPTION

Before describing in detail embodiments that are in accordance with the present invention, it should be observed that the embodiments reside primarily in combinations of method steps and apparatus components related to a computer camera lighting system and method. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

FIG. 1 illustrates a low light environment 100 with a user sitting in front of a laptop computer where the display is in an illumination mode for projecting light towards the user's face. The user 101 is facing the laptop computer 103. The laptop includes a display 105 and a digital video camera 107. In order to gain access to the computer, the user 101 is required to be authenticated through the use of facial recognition software running on the laptop 103 which utilizes a series of substantially real time images from the camera 107. Although a laptop computer is used in FIG. 1 by way of example, it should be evident to those skilled in the art that other electronic devices may be used having both a display and integrated camera. Additionally, other applications beyond facial recognition can also benefit from aspects of the invention. For example, various embodiments of the invention can be used to determine the need for more light and facial detail that works to improve independent video applications that run on the PC or electronic device. Video conferencing software can also benefit from the light generated by an LCD display.

An embodiment of the present invention is directed to a system and method for automatically and temporarily using the laptop's display as a light source for allowing successful or improved facial recognition and continuous security. In that a camera module such as camera 107 is built into devices, such as mobile phones, game devices, and personal computer laptops, these devices are not sensitive to lighting conditions since they may not include light sources that can face the user or operator. While in use, issues can arise in operating the camera with these devices since they are used in less than optimal conditions. These conditions can include, but are not limited to, insufficient front light or backlighting that provide difficult situations for any camera to obtain a useable image. These types of low ambient lighting situations, increased glare, or side and back-lighting conditions often result in the camera producing poor quality video images which are distorted and lack sufficient detail to be usable. As shown in FIG. 1, when the computer is used in a security application where user authentication is required and protected by facial recognition techniques, accurate identification of facial features requires sufficient detail for resolving details of the user's face. With poor quality video, face recognition software is often unable to recognize the user in poor lighting conditions, defeating the benefits of using this type of security software.

To address the poor image quality issues in low light conditions, the present invention is directed to a system and method for automatically and temporally changing operational modes of the display screen from a typical display into a "virtual light." The virtual light operates to provide sufficient illumination to the user's face. In situations when facial recognition software or tracking is used and the image quality is below a predetermined threshold, the system works to temporarily modify the display so that the display is full or partially switched from displaying video information in a first mode to projecting light at the user's face in a second mode. In operation, the display's pixels are changed to substantially all white and the display's brightness is automatically increased in amplitude to a higher level, typically maximum brightness. Those skilled in the art will further recognize that other conditions may be available, except for white pixels. While, typically, camera and photo sensors are most sensitive to white light, some sensors may be sensitive to other predetermined light frequencies, such as infra-red (IR), or specific colors, such as a substantially green or substantially blue color tone. In this situation, the display's pixels will be modified to output the preferred light frequency spectrum. In the case of IR, this type of process can be transparent to the user as these light frequencies are typically not visible to the naked eye.

Figure 1A:
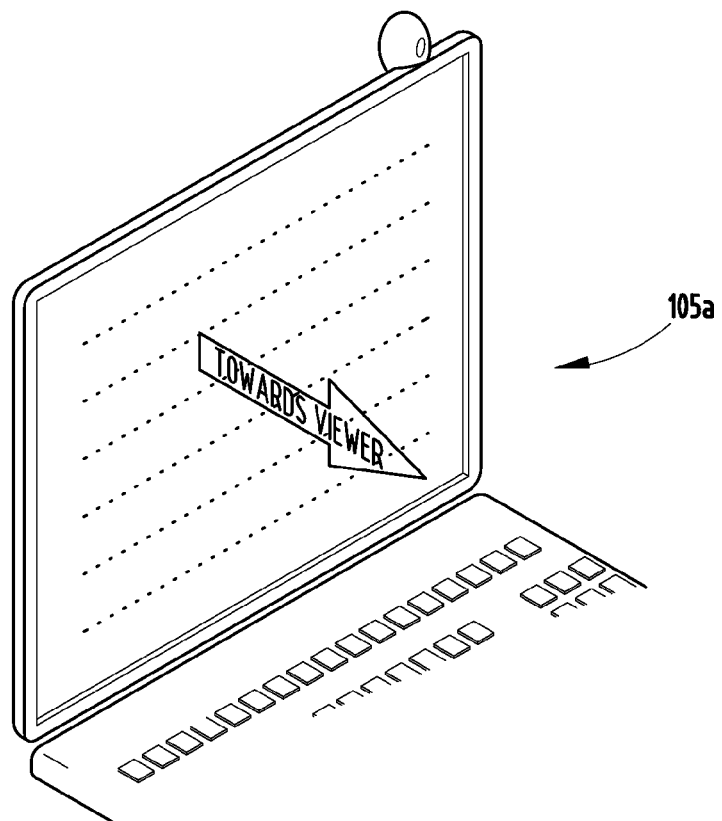
Figure 1B:
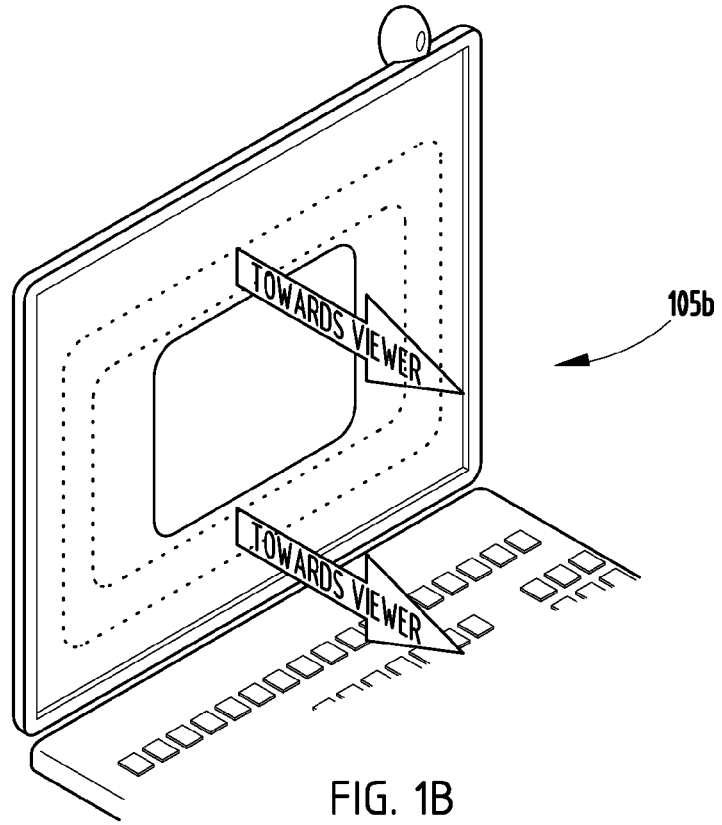

As seen in FIG. 1, light rays 109 are projected from display 105 towards the user's face 111. FIG. 1A illustrates the entire screen illuminated to project light toward the user. In an alternative embodiment, FIG. 1B illustrates only a portion or predetermined portions of the display that can be illuminated so that the user may continue to view video images, data, or other displayed information while separate portions of the display will illuminate the user's face. Once face recognition is successfully performed or the user logs in manually, the display pixels and brightness can be returned to their previous values or continued to be used in situations where video streaming and constant illumination is necessary. This illumination process can be performed in a substantially rapid fashion with little interference to the user experience. In practice, with today's cameras and displays, this type of system allows for fast and accurate recognition as well as continuous security even when there is no other ambient light source available for illumination.

Figure 2:
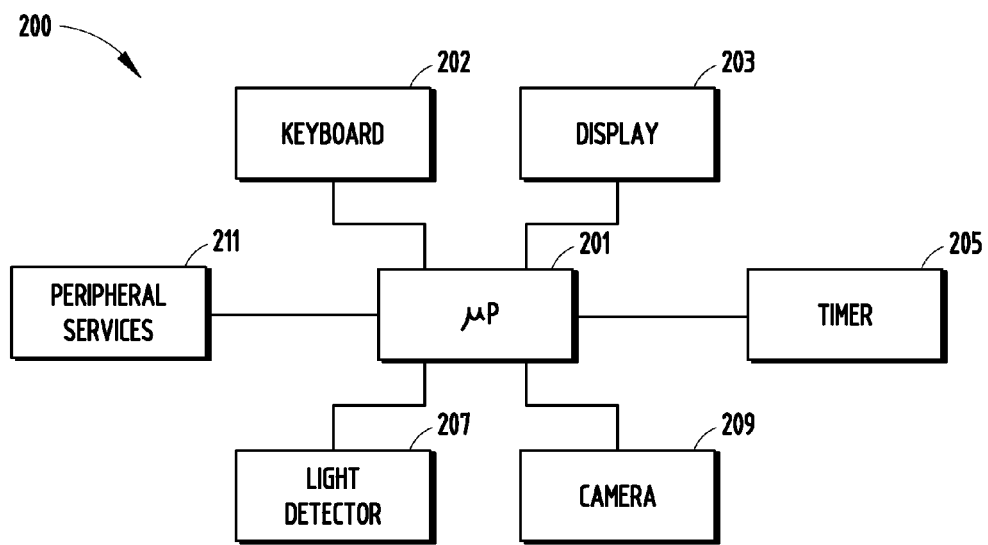
FIG. 2 is a block diagram of the video light system used in an embodiment of the present invention.

FIG. 2 is a block diagram of the lighting system used in an embodiment of the present invention. The lighting system 200 typically includes one or more microprocessors 201 that operate to run software, firm, or other application code. Connected to the microprocessor 201 is a keyboard 202 for allowing the user to type and enter data or other information by hand and a display 203 for displaying information in a first mode. The display may be an LCD, plasma, digital light processing (DLP), Liquid Crystal on Silicon (LCoS), Direct Drive Image Light (D-ILA), Cathode Ray Tube (CRT) LCD, or the like. As described herein, the display 203 may also be used in a second or "illumination" mode in order to project light toward a user's face in order to better enable devices using facial recognition software to recognize and/or authenticate facial features of the user that are placed in front of a camera 209. This illumination mode may be triggered by the facial recognition software not identifying predetermined targets or features of the user's face or, alternatively, the actuation of a timer 205 that detects the number of failed authentication attempts exceeding a predetermined threshold or the detection of a low light condition from a light detector 207 or the camera 209. As will be evident to those skilled in the art, other peripherals 211 may also be controlled by the microprocessor 201 that can be added by the use of the display 203 operating in its illumination mode.

Figure 3:
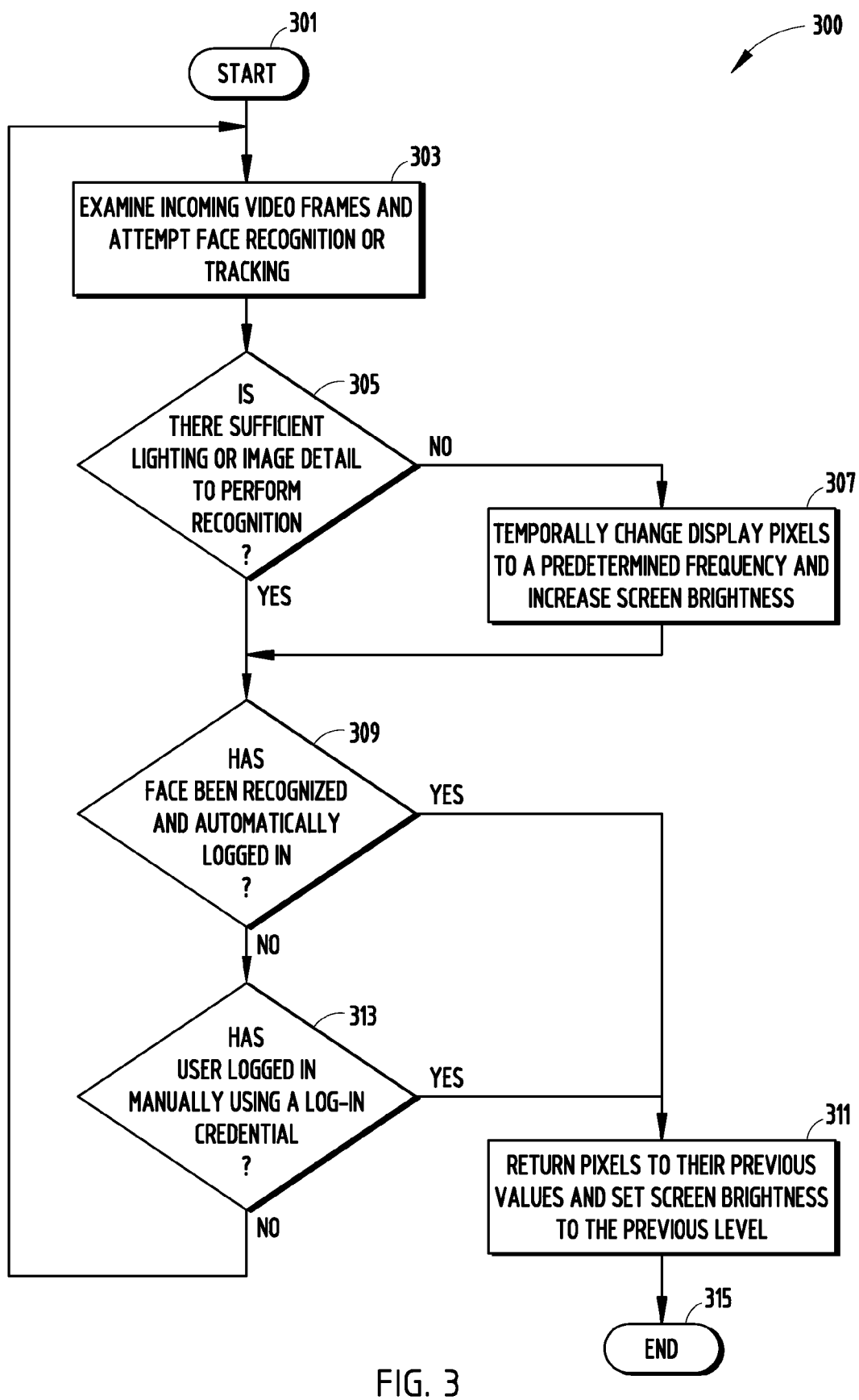
FIG. 3 is a flowchart diagram illustrating the video light method used in connection with an embodiment of the present invention.

FIG. 3 illustrates a block diagram showing operation of the lighting method in accordance with an embodiment of the invention. The method of lighting using a portable device 300 includes the step of starting the device 301 which uses some type of facial recognition security software that is enabled using a camera integrated with the device. Incoming video frames are processed from the camera, and facial recognition and tracking is attempted 303. A determination is made whether there is sufficient lighting or image detail to perform the facial recognition 305. This determination is based on a "quality" calculation in the facial recognition software that processes and evaluates detail in the user's facial features. If this detail is too low, i.e., below some predetermined threshold, then the mode of the display is changed from a display mode to an illumination mode 307. In an alternative embodiment, a camera associated with the laptop or a separate light sensor might determine if an illumination mode is needed, however, ambient light may not be a direct correlation to the quality of facial details. After the determination is made to initiate an illumination mode, pixels associated with the display are changed to some predetermined frequency spectrum or substantially white, and the brightness or amplitude of the light is increased to maximum or, alternatively, to some predetermined level. In still yet another embodiment, the display may operate in a mixed mode for allowing the user to view images, data, or other information on the display, while other predetermined portions of the display, such as the display perimeter, can operate to project illuminating light toward the user.

Thereafter, a subsequent determination is made if the user's face has been recognized and was automatically logged in 309. If the user has been granted access through the security software, the illumination mode is terminated and the display pixels are returned to their previous values. The brightness of the display is also set to its previous level 311 where the process ends 315. If the user has not been authenticated and/or logged in, a further determination is made if the user has logged in manually using a keyboard password or other peripheral device 313. If no face is detected but there is "black video" and keyboard activity, the illumination mode will also be initiated. If the user has not logged in manually, the process starts over 301. If the user has logged in manually, the number of pixels and the brightness level are returned to their preexisting values 311 and the process ends 315. Hence, the illumination mode is terminated when facial features are no longer present and a keyboard/mouse inactivity timeout timer expires. This operates to save battery power and prevents a distracting light from being present longer than necessary.

Thus, the present invention is directed to a lighting system and method for use with a laptop computer system or other electronic device that includes a display and one or more microprocessors processing facial recognition software that works to secure the computer from authorized users. The device typically will include a camera for providing images to the facial recognition software and may also be used for detecting a low ambient light condition. The display associated with the device operates in a first mode for displacing images and also in a second mode for providing illumination to a user's face under low ambient light conditions for allowing the facial recognition software to authenticate the user.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A video lighting system for projecting light at a user's face comprising;
    at least one microprocessor for controlling an electronic device;
    a display operable by the at least one microprocessor;
    a camera used with the electronic device for providing images for use by the facial recognition software; and
    wherein the display operates in a first mode for displaying images to a user and in a second mode for illuminating the user's face for detection by the camera by converting pixels around the perimeter of the display for allowing the user to simultaneously view video data on the display while being continually illuminated for enhancing the images provided by the camera such that the area of displaying images in the first mode is smaller in size than the entire screen of the second mode.

2. A video lighting system as in claim 1, wherein the second mode converts substantially alt pixels to a predetermined frequency spectrum of light.

3. A video lighting system as in claim 1, wherein the second mode converts substantially all pixels in the display to project white light.

4. A video lighting system as in claim 1, wherein the display operates in the second mode for a predetermined period of time.

5. A video lighting system as in claim 1, wherein the second mode converts pixels around the perimeter of the display for allowing the user to simultaneously view video data on the display.

6. A video lighting system as in claim 1, wherein the electronic device is a portable laptop computer.

7. A video lighting system for use with a personal computer comprising:
    a display;
    a microprocessor running facial recognition software used to prevent unauthorized access to the personal computer;
    a camera for providing images to the facial recognition software; and
    wherein the display operates in a first mode for displaying images to a user and in a second mode for illuminating the user's face for detection by the camera by converting pixels around the perimeter of the display allowing the user to simultaneously view video data on the display while being continually illuminated for enhancing the images provided by the camera such that the area of displaying images in the first mode is smaller in size than the entire screen of the second mode.

8. A video lighting system as in claim 7, wherein the display operates in the second mode when ambient light conditions are below a predetermined level.

9. A video lighting system as in claim 7, wherein the second mode converts pixels in the display to project a predetermined frequency of light.

10. A video lighting system as in claim 7, wherein the second mode converts substantially all pixels in the display to project white light.

11. A video lighting system as in claim 7, wherein the display operates in the second mode for a predetermined period of time.

12. A video lighting system as in claim 7, wherein the second mode illuminates only pixels around the perimeter of the display for allowing video data to be displayed inside the display's perimeter.

13. A lighting system for use with a laptop computer system comprising:
    a display;
    a microprocessor running facial recognition software;
    a camera for providing images to the facial recognition software and detecting a low ambient light condition; and
    wherein the display operates in a first mode for displaying images, in a second mode for providing illumination to a user's face under a low ambient light condition such that illumination is projected around the perimeter of the display allowing the user to simultaneously view video data on the display while being continually illuminated for enhancing the images provided by the camera such that the area of displaying images in the first mode is smaller in size than the entire screen of the second mode.

14. A lighting system for use with a laptop computer system as in claim 13, wherein the second mode is used for a predetermined number of facial recognition attempts.

15. A lighting system for use with a laptop computer system as in claim 13, wherein the second mode is used only when a laptop battery is above a predetermined level.

16. A lighting system for use with a laptop computer system as in claim 13, wherein the second mode converters pixels in the display to project light of a predetermined frequency.

17. A lighting system for use with a laptop computer system as in claim 13, wherein the second mode converts pixels in the display to project a substantially white light.

18. A lighting system for use with a laptop computer system as in claim 13, wherein the images may be displayed simultaneously on an interior portion of the screen.

19. A method for projecting light at a user of an electronic device for use with facial recognition software comprising the steps of:
    providing at least one microprocessor for controlling the electronic device;
    operating a display by the at least one microprocessor;
    utilizing a camera with the electronic device for providing images by the facial recognition software;
    operating the display in a first mode for displaying images and in a second mode for illuminating a user's face for detection by the camera by converting pixels around the perimeter of the display allowing the user to simultaneously view video data on the display while being continually illuminated for enhancing the images provided by the camera; and
    configuring such that the area of displaying images in the first mode is smaller in size than the entire screen of the second mode.

20. A method for projecting light as in claim 19, further comprising the step of:
    operating the first mode and second mode simultaneously.

21. A method for projecting light as in claim 19, further comprising the step of:
    providing light in the second mode only around the perimeter of the display.

22. A method for projecting light as in claim 19, further comprising the step of:
    converting pixels in the display to project light of a predetermined frequency.

23. A method of projecting light as in claim 19, further comprising the step of:

converting substantially all pixels in the display to project white light while in the second mode.

24. A method of projecting light as in claim 19, further comprising the step of:
operating the display in the second mode for a predetermined period of time.

25. A method of projecting light as in claim 19, further comprising the step of:
operating a portable laptop computer as the electronic device.

* * * * *